(12) United States Patent
Branson

(10) Patent No.: US 9,594,183 B2
(45) Date of Patent: Mar. 14, 2017

(54) METHOD FOR BURIED SERVICE DETECTION USING A MAINS SOCKET

(71) Applicants: LEICA GEOSYSTEMS AG, Heerbrugg (CH); CABLE DETECTION LIMITED, Cresswell, Staffordshire (GB)

(72) Inventor: Simon Branson, Staffordshire (GB)

(73) Assignees: LEICA GEOSYSTEMS AG, Heerburg (CH); CABLE DETECTION LIMITED, Cresswell (GB)

( * ) Notice: Subject to any disclaimer, the term of this patent is extended or adjusted under 35 U.S.C. 154(b) by 254 days.

(21) Appl. No.: 14/389,332

(22) PCT Filed: Mar. 14, 2013

(86) PCT No.: PCT/EP2013/055286
§ 371 (c)(1),
(2) Date: Sep. 29, 2014

(87) PCT Pub. No.: WO2013/143868
PCT Pub. Date: Oct. 3, 2013

(65) Prior Publication Data
US 2015/0077121 A1    Mar. 19, 2015

(30) Foreign Application Priority Data
Mar. 30, 2012   (EP) .................................... 12162438

(51) Int. Cl.
*G01V 3/08*   (2006.01)
*G01V 3/02*   (2006.01)

(52) U.S. Cl.
CPC ................ *G01V 3/088* (2013.01); *G01V 3/02* (2013.01); *G01V 3/081* (2013.01)

(58) Field of Classification Search
CPC ........... G01V 3/02; G01V 3/081; G01V 3/088
(Continued)

(56) References Cited

U.S. PATENT DOCUMENTS

| 4,438,401 A | 3/1984 | Iwamoto et al. |
| 4,600,356 A | 7/1986 | Bridges et al. |

(Continued)

FOREIGN PATENT DOCUMENTS

| CN | 201043989 Y | 4/2008 |
| CN | 101652679 A | 2/2010 |

(Continued)

OTHER PUBLICATIONS

European Search Report dated Sep. 11, 2012 as received in Application No. EP 12 16 2438.

*Primary Examiner* — Jay Patidar
(74) *Attorney, Agent, or Firm* — Maschoff Brennan

(57) ABSTRACT

The invention concerns a method for detecting buried services by electromagnetic means with introducing an artificially generated electrical detection signal indirectly via soil to the buried service, detecting an electromagnetic field originating from the introduced underground detection signal, which is preferably following along the buried services, by a mobile detection unit above ground, and determining the proximity of the structure to the detection unit according to the detected electromagnetic field of the detection signal. Therein, the soil conducted detection signal is supplied via a mains socket.

14 Claims, 9 Drawing Sheets

(58) Field of Classification Search
USPC .................................................. 324/326–329
See application file for complete search history.

(56) References Cited

U.S. PATENT DOCUMENTS

| | | | |
|---|---|---|---|
| 4,740,757 A * | 4/1988 | Converse | ................ G01M 3/40 |
| | | | 324/326 |
| 5,194,812 A | 3/1993 | Yokoi | |
| 5,418,447 A | 5/1995 | Beha et al. | |
| 5,592,092 A | 1/1997 | Mechler | |
| 6,437,726 B1 | 8/2002 | Price | |
| 8,115,489 B2 | 2/2012 | Pearson et al. | |
| 8,183,867 B2 | 5/2012 | Fling et al. | |

FOREIGN PATENT DOCUMENTS

| | | |
|---|---|---|
| DE | 27 35 344 A1 | 2/1979 |
| EP | 2 278 358 A1 | 1/2011 |
| EP | 2 362 241 A1 | 8/2011 |
| GB | 2 174 273 A | 10/1986 |
| GB | 2 235 982 A | 3/1991 |
| GB | 2 407 013 A | 4/2005 |
| JP | 2003-227878 A | 8/2003 |
| WO | 2008/064851 A2 | 6/2008 |
| WO | 2008/064852 A2 | 6/2008 |

* cited by examiner

METHOD FOR BURIED SERVICE DETECTION USING A MAINS SOCKET

FIELD OF THE INVENTION

The present invention relates generally to a detection method for detecting a buried service, such as an underground conduit or wiring system at a construction site, to a detection signal supply device and to a detection system.

BACKGROUND

It is quite common on construction sites to use devices for detecting underground structures before or while digging. Such structures are often occurring in form of services for electricity, gas, fuel, water, or communication data among other conductive underground structures. Although the location of most of these services is already known from a surveyor's plan of the site, their locations can have uncertainties, or there could be additional services that are not mentioned therein. Often, they are also simply overlooked by the operator of an earth moving machine during work.

The prevention of damage to underground structures while digging in a trench or in areas being excavated is an important task. As damage to a service can cause serious impact and costs, these additional measurements are taken in order to be able to detect the proximity of such services on the site before or while excavating. Devices for this purpose are known as Cable Avoidance Tools also-called CAT. An embodiment of such a device is for example described in EP 2 362 241.

One way to locate underground services is to detect electromagnetic fields sent out by the service itself. In order to do this the services must have a naturally occurring electrical signal witch emits a field that is detectable above the ground. This works well for active power supplies, but for example a wiring system of switched off street lights, unused or low-voltage communication cables, gas- or water-pipes can hardly be detected in this way.

In order to avoid this limitation, several developments were made to improve the detection and to be able to detect different types of services as well. U.S. Pat. No. 5,194,812, U.S. Pat. No. 4,600,356, U.S. Pat. No. 5,592,092 and U.S. Pat. No. 6,437,726 are referring to such approaches. The underground structures need to emit electromagnetic fields within a usable frequency range and which are strong enough to be detectable above the surface. As the fields have to be caused by naturally occurring electrical signals, the usability of this method is limited to live power lines and some communication cables.

U.S. Pat. No. 4,438,401, JP 2003 227878 and DE 27 35 344 are disclosing systems wherein metallic services with no naturally occurring signals are directly connected to a signal-generator. In this way an electrical signal can be conducted to the service, and therefore it is possible to detect it by its electromagnetic field. For doing so the service has to be located and connected somewhere near the construction site. This can be quite a difficult task, since some services are hidden, not accessible or even live wires and therefore cannot be connected to. These systems work well for lots of metallic services, but the detection is still limited to services containing electrically conducting materials. For example, water-conduits made out of plastic are hardly detectable in this way.

In EP 2 278 358 the signal to be detected is an artificially generated signal from a signal source, which is introduced into soil by at least two electrodes (e.g. earth spikes, tent-pegs, etc.) which are connected to the signal source. For doing so, there is at least one long cable required, as good detection results require a placement of the electrodes where they are spaced apart at least five meters, preferably some tens or even hundreds of meters. The advantage of this method is that almost any service which provides a better electrical conductivity than soil can be detected by such a system.

A disadvantage is the long cable which is required to supply the signals to the soil. Such a long cable is quite difficult to handle and requires a big bulky cable reel. Especially at worksites,—having lots of machinery, vehicles, workers and other traffic—a laying of a long cable above ground can be difficult and problematic, as it will probably impede the workflow. The cable might also easily get damaged by some machinery or worker or can cause stumbling. A proper laying out of such a cable for connecting an earth spike for signal injection is a time consuming preparation job for the actual detection task. Also the removing of the long cable and a proper storage on the cable reel, often combined with a cleaning of the cable from worksite dirt, can take a long time. The establishing and removing of the earth current setup can often take even longer than the actual detection.

SUMMARY

Some embodiments of the present invention may improve a detection of buried structures by electrical detection signals, which are artificially introduced to those structures by means of a soil connection Some embodiments of the invention may detect structures that are hardly possible to detect by any of the methods in prior art, for example, the commonly used plastic water-conduits, which is done by a detection signal floating through soil and along those structures.

Some embodiments may simplify the setup which is required for such a detection, in particular also to lessen the required equipment and also to provide a simplified and miniaturized equipment for such a task.

Some embodiments of the invention may avoid the usage of earth spikes and long connection cables for introducing detection signals into soil.

Some embodiments of the invention may provide a proximity detection method of buried services with an increased ease of use and quick setup, which is providing a detectability of other buried services than mains supply.

The detection method according to the invention is based on an emission of electromagnetic fields from an underground structure, even if the structure does not emit such fields naturally. The field is emitted by an artificially introduced electrical current flowing along the structure. The introduction of the current is not achieved with a direct connection of a current-source to the structure to be detected, nor is it based on a weak electromagnetic coupling of the structure with an electromagnetic radio field which is sent out from above ground towards the structure and which is reflected or reradiated back to an above ground detection device.

The detection method for a conductive, elongate, buried structure, in particular for the proximity of an underground conduit or wiring system at a construction site, is executed by:

generating an alternating electrical detection signal, preferably of a desired frequency and/or current strength by a current-source, introducing the detection signal to soil so that it is floating (floating in the sense of a not necessarily conductor-bound flowing) through soil and concentrating along the structure so that the detection signal along the structure is emitting a time-variable electromagnetic field, detecting the electromagnetic field by a mobile detection unit above ground that is electrically insulated from the ground and determining the proximity of the structure to the detection unit according to the detected electromagnetic field.

The introducing of the detection signal is done via a mains socket, whereby the detection signal is connected to soil at (at least) two locations which are spaced apart some distance.

The detection signal is conducted underground by soil, wherein the signal preferably follows buried underground service structures, as these provide a path of least resistance in the soil. The detection signal will therefore concentrate along the buried services, whereby an electromagnetic field emerges along the service, which field can be detected above ground by the detection unit.

An embodiment of the flow-path of the electrical current of the detection signal according to the invention is:

from the current-source via the socket to a PE-conductor of mains, via mains to a local grounding of the PE-conductor as a first soil connection at a local premises, from the first soil connection through soil to the structure, following at least a part of the structure as path of least resistance in soil, from the structure through soil to at least one second soil connection as a remote grounding at a remote substation of mains supply, from the second soil connection to a conductor of a mains supply line, and along the mains supply line to the local premises and via the socket back to the current-source.

Obviously, the flow path can also be defined vice versa.

According to the invention, the detection signal is introduced by means of a mains socket for establishing a conductive soil coupling at two spaced-apart locations. The two locations are preferably situated in the vicinity of an area of interest. For example, first and second soil connections can be located at opposite sides of the area of interest, but this is not a strict requirement, as the detection signal will distribute quite broadly in the soil, especially if the remote and local groundings are spaced apart more than 10 m from each other, which will be a common case. The current is introduced via a mains plug which connects the detection signal to the mains wiring, in particular introducing the detection signal between the neutral-conductor (N) and the protective earth-conductor (PE) of the mains wiring at a domestic property.

According to the invention, an introduction of detection signals as soil currents (or so-called Earth Return Injected Currents—ERIC) can thereby be achieved without the usage of dedicated earth spikes and a long cable. Instead, a simple socket plug, without a requirement for any external wiring can be used to supply the detection signal into soil at the two different locations. Thereby, buried cables and services can be detected in the vicinity of a domestic property where a mains socket is available, which is a quite common situation for cable detection tasks.

In other words, the detection method for detecting buried services, in particular an underground conduit or wiring system at a construction site, by electromagnetic means is done with an introducing of an artificially generated electrical detection signal, in particular as an alternating electrical current of a desired frequency from a current-source, indirectly via soil to the buried service, a detecting of an electromagnetic field originating from a thereby introduced underground current, which is preferably floating or following along the buried services, by a mobile detection unit above ground that is preferably electrically insulated from the ground, and determining the proximity of the structure to the detection unit according to the detected electromagnetic field of the detection signal.

According to the present invention, the soil conducted detection signal is supplied via a mains socket.

Thereby a flow-path of the detection signal is:

from the current-source to a first remotely grounded conductor of mains wiring at the socket, via the first conductor from the socket to a remote substation of a mains supply network, where the first conductor is grounded, so that the signal is conducted to soil material, floating through the soil material and following at least a part of the buried service as path of least resistance within the soil material, from the buried service through soil material to a domestic earthing point, where a second conductor of mains wiring is grounded, in particular a protective earth conductor, via the second conductor to the mains socket and back to the current-source.

Obviously, the above described path can also be vice versa.

The detection signal which is thereby introduced at the buried services can be detected by using a Cable Avoidance Tool configured to trace the detection signal. Configured to trace the detection signal means, that the detection device is sensitive for the frequency of the detection signal, for example a receiving circuit (like receiving coils, filters, amplifiers, evaluation circuitry, etc.) is capable and/or specially adjusted to pick up the electromagnetic fields produced by the detection signal, especially to the frequency or frequency range of the introduced detection signal.

In a domestic type application, a detection signal source according to the invention can be a device, which is embodied as a self-contained unit with the electronics housed in a box combined with a mains plug (for example a phone charger size box) and which is containing an electronic circuit for generating the detection signal. The circuit can take power from the mains socket and generate low voltages from mains to power analogue and digital electronics which generate an accurate detection signal (ERIC) of a desired frequency. This detection signal can then be superimposed onto the mains via the socket, for example by choosing capacitors that have low impedance at the higher frequency of the detection signal and high impedance at the comparably lower 50/60 Hz mains frequency. This detection signal then travels in the soil or ground and will couple onto other conductive buried structure. Thereby, the structure can be detected by a suitable sensor, for example a Cable Avoidance Tool.

The current-source preferably provides an alternating current with a frequency in the range of about 5 kHz to 300 kHz, for example 33 kHz, although other frequencies can be used as well, especially to take care of certain soil conditions or RF-regulations. In order to ensure proper operation, the current-source can be equipped with a system to detect whether the current is flowing or not.

In a first exemplary embodiment according to the invention, the signal supply device generates a detection signal, e.g. with a frequency of 32.768 kHz, which is introduced into soil by mains-wiring, as discussed above. The detection signal of that frequency can be unmodulated (e.g. a sinusoidal or nearly sinusoidal signal) and the resulting RF-Signal which is emitted by the therewith occurring current along its flow path (in particular along the buried conductive structures in soil to be detected) can be detected by a corresponding cable avoidance detector unit which is sensitive for this frequency, e.g. tuned or filtered to the same frequency, like the 32.768 kHz in the example from above.

In a second exemplary embodiment, the detection signal, (e.g. the signal from above with the 32.768 kHz as base frequency), can be modulated with a defined modulation signal, like e.g. 8.192 kHz (as modulation frequency). Such modulation of the signal can be applied constantly or in a predetermined sequence according to known modulation principles. Thereby, a receiving section of a detection device, which is built to provide such a feature, can identify the detection signal according to this defined modulation. The sensed detection signal can thereby be identified to originate from this signal supply device and to be dedicated for the present detection system. For achieving such, the receiver in the cable detection device can detect the modulation of the signal and thereby uniquely identify the signal to be the detection signal from the detection system. Thereby, e.g. other interfering signals from other sources, which might be coincidentally present in the detection area as well, can be suppress or identified as such and the sensitivity to this specially modulated detection signal of the detection device can be increased. Thereby, the achievable SNR (signal to noise ratio) of the detection can be improved, as the signal is now uniquely identifiable out of the noise floor according to its modulation. This can be done by a detection of the modulation in the receiver (e.g. by a demodulation) which determines and evaluates such a modulation.

The frequency values mentioned above are exemplary values for illustration of principle, in practical embodiments also other frequencies can be used as base and/or modulation frequencies.

The modulation and its detection can be done with a defined, in particular constant frequency, or the modulation can be modified according to a predefined sequence that is stored in the detection signal supply device and maybe also stored in the detection device for its identification within the received signal at the detection device. For this, the detection signal supply device can e.g. also be switchable between supplying a signal in an "unmodulated mode" with a defined frequency, a "modulated mode" where the signal of the defined frequency is modulated and/or a "modulated and coded mode" where the modulation is coded by a known sequence. Such a coding can be analog (e.g. a sinusoidal amplitude or frequency modulation, etc.) or digital (e.g. an on-off keying of the modulation signal, etc.). Also the detection device can provide corresponding at least one mode of detection, corresponding to the modes of the supply device mentioned before. Those modes can be selectable by the user or modulation and/or coding can be automatically detected—if present. Optionally the user can e.g. select a certain predefined sequence at the supply and/or detector to match those two particular devices uniquely to each other.

Although the above elaborated embodiment of the signal generation and/or detection uses modulated resp. modulated and coded detection signals, those signals can in general also be detected according to their base frequency only if a detector is used, which does not evaluate if there is a modulation and/or coding (and without the mentioned advantaged achievable by the evaluation of the modulation).

Therefore, the invention also relates to a cableless soil-conducted detection signal supply device for an underground service detection by electromagnetic means with a soil conduction of the detection signal to a, particularly non-mains, buried service. The supply device comprises a socket plug, a detection signal generator, an AC coupling of the detection signal generator to the connectors of the plug.

The electromagnetic field of the detection signal current is detected by a detection unit above the ground. The detection unit can be carried around by a worker or attached directly to an earth moving machine, such as an excavator, digger, dozer, backhoe or dredger. It does not need a conductive connection to the soil and can therefore be moved without ground contact. In general, the detection unit comprises at least some kind of aerial, coil, fluxmeter or another sensor to detect electromagnetic fields and generates an output-signal dependent on the field. A computational unit analyses the signature of these fields and generates an output dependent on them. Preferably, the detection unit comprises at least two sensors, whereby a distance from the detection device to the location of the emitter of the electromagnetic field can be determined.

The detection unit can be constructed as a mobile, hand held device that can be used to scan for services before or while digging. In this case, the worker can mark the location where a service is detected in order to avoid collision during excavation.

The detection unit can also be attached to an earth moving machine. The detection unit may issue a warning signal to the operator of an excavator when a structure is detected in the proximity of the detection unit or another known reference point. An example for such a reference point is the tip of the bucket of an excavator, whereto the detection unit is fixed in a known relative position, in particular by attaching the detection unit to the arm of the excavator.

The warning signal can also contain additional information about the proximity of the structure, for example a distance from a reference point, such as the bucket of the excavator, to the structure. If the distance between the structure and the bucket is below a critical distance, a warning will be issued. The critical distance can either be defined as a fixed value, or set by the operator according to on site requirements. The warning can be issued in order to inform the operator of the fact that a structure is close to the actual working area or it can shut down at least part of the excavator. For the purpose described above, the detection unit can be fixed to the excavator, for example somewhere near its bucket.

The invention therefore further relates to a proximity detection system for a conductive, elongate, buried structure, in particular an underground conduit or wiring system at a construction site, which comprises
    a detection signal supply device as described above for introducing an artificially generated detection signal into soil at two distant locations via a mains socket, and
    a detection unit with an electromagnetic sensing means and an indicator for a presence of and/or a distance from a buried service according to an electromagnetic field emitted at the service.

In other words, the present invention relates to a usage of a mains socket for supplying soil injected detection signals for a detection of an underground service, in particular for services other than mains, by electromagnetic means. Therein, the detection signal is floating from a mains supply substation's earthing point—through soil along at least part of the service—to a domestic earthing point. As the buried service provides least resistance for the detection signal in the soil, the service (although not directly conducted to the signal source) dominantly conducts the detection signal. According to the electromagnetic field of the detection signal, the detection is established.

BRIEF DESCRIPTION OF THE DRAWINGS

The proximity detection method according to the invention and the devices and setup according to the invention are described or explained in more detail below, purely by way of example, with reference to working examples shown schematically in the drawing. Specifically.

DETAILED DESCRIPTION

The diagrams of the following figures should not be considered as being drawn to scale.

Figure 1:
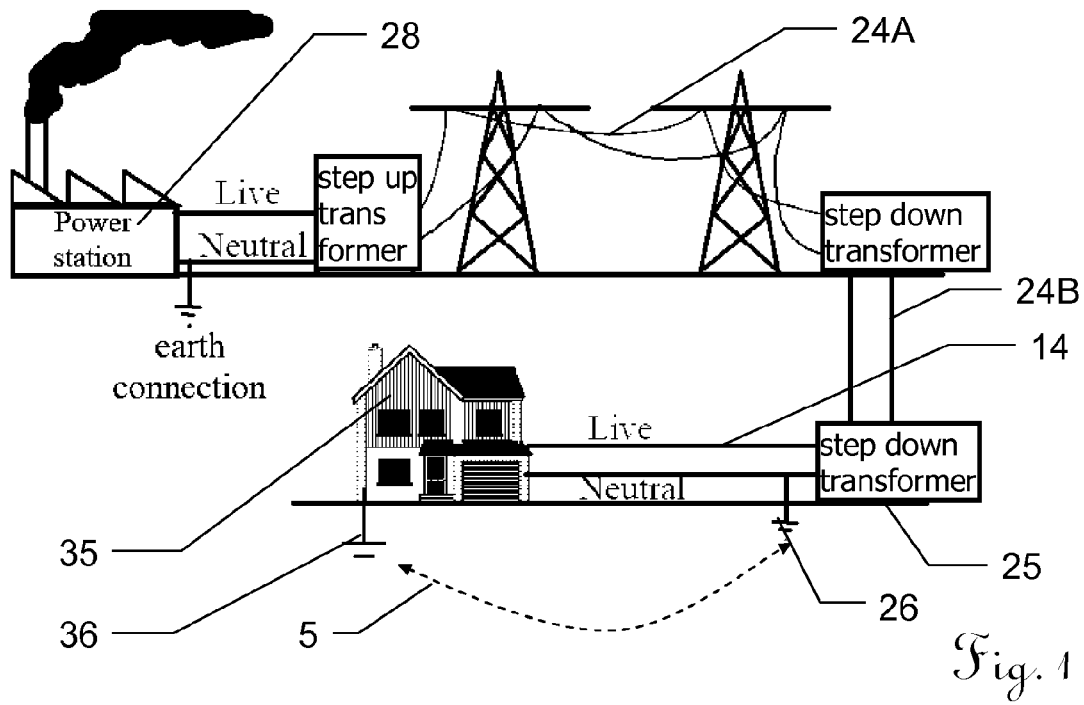
FIG. 1 shows an example of a first embodiment of a detection signal supplying according to the invention.

FIG. 1 illustrates an example of an electrical power supply network. In the power station 28, electrical energy is produced, which is then fed into the electrical power supply grid by means of high voltage overhead power lines 24A at the shown power pylons. At local power stations, local distribution is then continued, preferably at lower voltages, in this example by the underground power supply lines 24B to sub-stations 25 for domestic distribution of the electrical energy to the domestic properties 35. In other embodiments, the high voltage lines and the local stations and/or the sub-stations can be omitted on this path. In a simple embodiment, the domestic property 35 can even be directly connected to the generator of the electrical energy 28.

Some distance away from the property 35, at or near the local mains substation 25, or at the power station 28 itself, the neutral of the mains electricity supply is connected to earth 26. Therefore, when using the earth current approach for locating buried services, the neutral wire of the mains wiring can be used in place of a long extension wire for a remote electrode for soil connection which needs to be deployed in prior art.

For example, a house 35 has a local earth point 36, usually a conductive metallic structure (such as a copper rod, ground strap, a zinc-plated steel ground rod or another kind of drain wire) which is buried in the ground just outside the property 35. The earth is also connected to the metallic water pipes which are buried in the ground, sometimes as primary earthing means, sometimes for equipotent bonding only.

The principle that applies in the earth current approach according to the present invention is to apply a suitable signal between the Earth-wire and the Neutral-wire, in a domestic property 35. This, for example, establishes a circuit in which the Earth Returned Injected Current signal 5 travels along the neutral wire of the mains supply line 14 and back through the ground or soil 12 between the property 35 and the substation 25 (or another place where the Neutral wire is connected to soil).

One disadvantage of deploying detection signals 5 in prior art is the need for a long extension cable for the soil electrode(s). In areas where access to a mains socket 8 is available, the present invention avoids the extension cable as part of an already existing mains supply network 14 can be used instead. The detection itself, in particular the distribution of the underground detection signal 5 in soil 12 and the above ground detection, works as if the detection signal 5 had been deployed with two Earth stakes, one at the property 36 and one at the substation 25, using a long extension cable, but according to the invention, the need for the long extension cable and its deployment has been removed.

In an embodiment for a domestic type application the supplying of the detection signal 5 can be achieved by a self-contained unit—for example an electronics in a single box which can be combined with a mains plug, such as a wall power supply or wall wart, without an external cable. For example a device 2 for supplying a detection signal can be embodied as a phone charger size box, which contains an electronic circuit that takes power from the mains, generates a detection signal 5 of the desired frequency and superimposes this detection signal 5 on the Neutral wire, (e.g. by capacitive coupling). A number of frequencies can be used that allow compliance with the necessary IEC conducted emissions requirements for equipment connected to the mains. An exemplary frequency for such an application is 33 kHz. Such a device 2 has just to be plugged into a mains socket 8 at a property 35 and the detection process can start, without any further wiring.

An exemplary purpose of such a system would be to check for the presence of buried services 1 if excavation works are to be carried out in the vicinity of the property 35. According to the invention, the most hazardous of the buried services—the mains supply line 14 itself—will definitely have a detection signal 5 on it, as it is conducted to the detection signals source 2. Such is known from prior art, which teaches an establishment of a direct connection of a signal source to live mains lines. But according to the present invention, also other services 1 than mains 14 are detected, wherefore in prior art an earth current setup with a long extension cable and earth spikes was required to be installed in the vicinity of the detection area. Moreover, the primary intent of the present invention is not the detection of the mains supply line 14 (which is carrying a detectable mains signal anyway), but the detection of non-mains services 1 (which may not carry a detectable signal by its nature). Such an approach is not taught in prior art. In particular not the supplying of a earth or soil 12 conducted detection signal 5 by a mains plug 2. The usage of mains to detect buried structures 1 which are not directly connected to mains is a new approach, which simplifies the task of determining whether a certain area in the vicinity of a property 35 is clear of services 1 or to locate those services 1. A direct connection of the services 1 to be detected to the detection signal source 2 is not required to achieve detectability, as the present approach supplies the detection signal 5 to the services 1 through soil 12. The Earth Returned Injected Current flows back through the ground and along any conductive buried services 1, allowing them to be detected in the proximity of the property 35.

The detecting of the present invention comprises a buried service 1 being a non-mains-supply-service 1, which means that it is separate of the mains supply network 14 and unconducted to the electrical circuit of the mains socket 8. The service 1 is detected according to a soil conducted detection signal 5 floating along at least part of the service 1. So according to the invention, detecting at least one service 1 in addition to the mains-supply-service 14 to which the detection signal 5 is connected can be established. The additional service 1 can be electrically passive and does not need to have a naturally occurring electrical signal on it.

Figure 2:
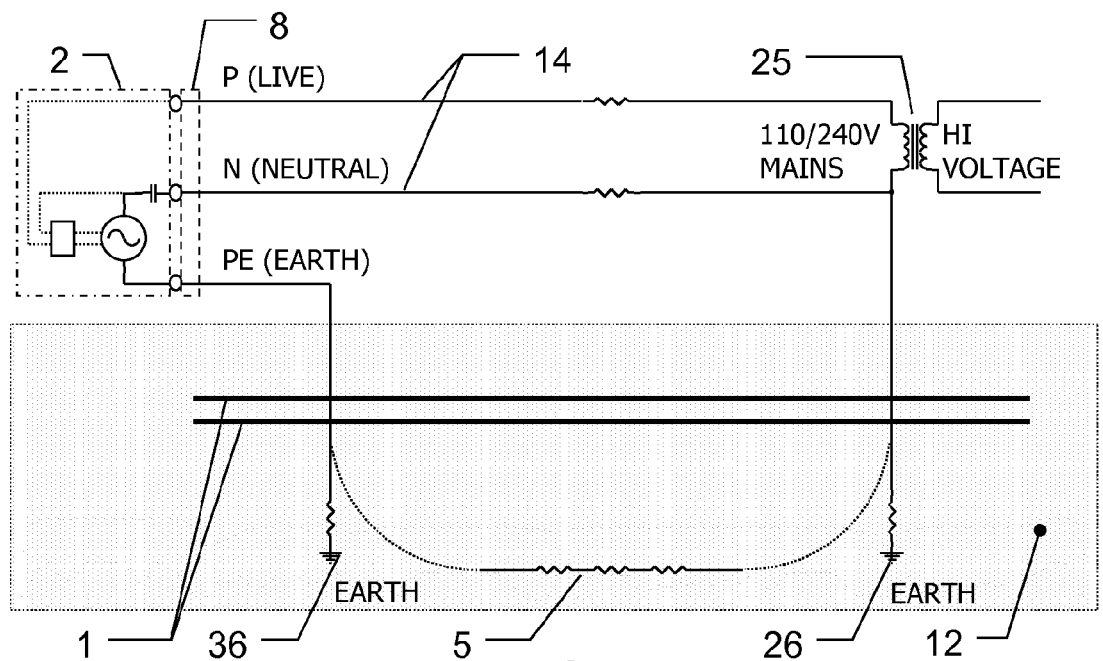
FIG. 2 schematically shows an embodiment of an equivalent circuit of supplying detection signal to soil via a mains socket according to the invention.

FIG. 2 shows the path of the detection signal 5 according to the invention in more detail in an electrical circuit diagram. Again, the detection signal source 2 is plugged into a mains power socket 8, in particular in such a way that it is supplying its artificially generated RF-Signal between the Earth-connecter and the Neutral-connector of the mains socket 8. The coupling of the signal can for example be established by means of a magnetic coupler or a high pass filter, which is transmitting the high frequency of the detection signal but blocking the lower frequencies of mains and DC, e.g. a coupling by a capacitor. As shown in the figure, the coupling can also be embodied as a direct conductive coupling to Earth and a capacitive coupling to the Neutral.

According to the invention, this coupling is supplying soil currents by establishing a flow path for the detection signal from a first local grounding 36 of the Earth-wire at the property 35 to a second remote grounding 26 at a thereto connected mains sub-station 25, where e.g. the neutral point of a power-line-transformer is grounded. Thereby, a flow path through soil 12 is established for the detection signal 5, without having to lay out a dedicated cable to the second, remote soil connection, as the already existing mains power supply lines 14 are used therefore.

The soil 12 comprises some buried structures 1, for example gas pipes of cast iron, earth bounded power or communication lines or water conduits made either of cast iron, copper or plastic. Since the earth bounded structures 1 have a much higher conductivity than the surrounding soil 12, which can comprise clay, rock sand and moisture, the detection signal 5, introduced on both sides directly into soil material, takes the way of least resistance which is along—at least part of—the structure. In the figures, the direction of the current 5—introduced by the electrodes—is symbolically shown by arrows nearby the flow-path of the current.

Due to the fact that the conductivity of an underground structure 1 is approximately at least a hundred times better than the connectivity of the soil 12, the current introduced into the soil 12 will take a flow path of least resistance that mainly follows the underground structure 1.

A simple model to explain the principle is to take the soil 12 and the structures buried therein as a set of multiple conduction paths. The impedance of the soil material 12 is typically in the range of at least some kilo-Ohms to mega-Ohms, whereas buried structures 1 are in the range of a few Ohms or less. Therefore, the majority of the introduced current will flow from the grounding electrodes 26,36—through soil material 12—to the buried structure 1 and along—at least part of—the structure 1, emitting an electromagnetic field.

A setup like this works with all kinds of either electron- or ionic-conductive structures that are earth bound in some ways. For example, water inside of plastic conduit being grounded via domestic copper pipes and therefore being connected to soil, will work according to the invention in a similar way than any pipe made of conductive material such as cast iron, copper or the like.

The method is not limited to the detection of a single underground structure 1. In case of more than one structure 1 the detection signal 5 will split up between the structures 1. The only limitation is that there has to be sufficient signal strength 5 along each of the structures 1 for the method to detect all of them. Experiments on an example setup have shown that a current strength of about 4 mA makes a structure 1 in about one meter depth well detectable. As a special example, the detection of five underground structures 1—buried in more or less parallel direction, having nearly the same conductivity—in about one meter depth would therefore require least 20 mA of current from the current-source 2.

The detection signal source 2 is, for example, providing an alternating current 5, having a frequency in the range of about 5 kHz to 300 kHz, in particular about 8 or 33 kHz, although other frequencies can be chosen to take care of certain soil conditions or regulatory constrains. The current strength of the detection signal 5 can observed by the signal source 2, which can indicate the flow of the current 5 along the path. If no or not enough current is flowing, an indicator (e.g. acoustical with a buzzer, optical with a light or a gauge), can provide information to the user if the supplying of the signal 5 is not within a reasonable margin, (e.g. zero impedance for the detection signal—which would indicate a short circuit, infinite impedance for the detection signal—which would indicate that no detection signal can be supplied, . . . )

The detection signal supply 2 can also be embodied with a control-loop, ensuring a certain predetermined amount of current for the detection signal 5, e.g. by varying a voltage of the supplied detection signal 5 accordingly. If the control loop fails to establish a desired strength of the detection signal 5 within a predetermined, reasonable boundary, this fact can be indicated to the operator. As the mains power lines 14 are carrying a voltage above any touch safety levels, the voltage of the detection signal 5 can also exceed this limit, as the established circuit is for the detection signal 5 is non-touchable anyway (or by design).

Figure 3:
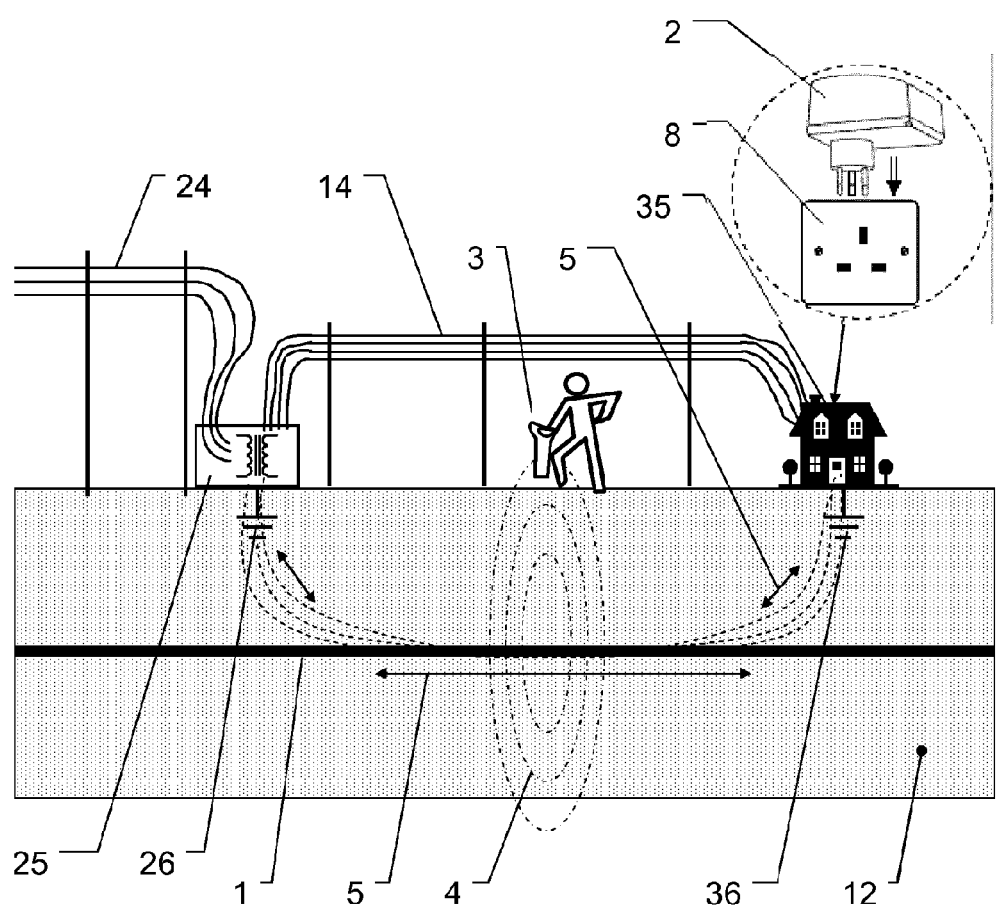
FIG. 3 shows the flow of the current, the electromagnetic field emitted thereby, and Its detection by a handheld detection unit according to the invention in a cross section of the ground.

FIG. 3 shows, schematically, in a cross-section view, how the earth injected detection signal 5 generated by an AC-current-source (e.g. the shown device 2) is introduced by means of a mains socket 8. The detection signal 5 is conducted through soil 12 and introduced to the buried structure 1 and the thereby emitted electromagnetic field 4 can be detected by a detection unit 3 above the soil 12. The example shows a setup on a construction site to execute the service detection according to the invention, for example prior an excavation of an area by an earth moving machine or before laying open a buried service to establish a tap or do some maintenance.

In this example, it is known that there has to be a structure 1 in form of a district heating supply somewhere underground, but the exact location of it is not known. Therefore, a setup according to the invention is used, comprising the detection signals source 2 which is plugged into a mains socket 8 at a local property 35. The detection signal 5 then follows the Neutral conductor along the power supply lines 14 to the nearby transformer station 25, where it is with low impedance connected to soil 12 at the grounding point 26. The socket 8 also provides an earth conductor, which is connected to locally grounding point 36 at the property 35 where the socket 8 is. The detection signal 5 is thereby supplied by a circuit which connects to a first local soil connection 36 and a second remote soil connection 26, which is closed by soil 2. The buried service 1 provides least resistance in soil 12, wherefore a dominant part of the detection signal 5 will concentrate at least along some part or section of this structure 1. The detection signal 5 along the structure 1 is thereby emitting an electric field 4, which can be detected by a therefore designed detection unit 3.

This example shows a hand held detection unit 3, carried by a worker. With this setup the worker can mark the positions, and preferably also the depth, of the underground service. The mobile detection unit 3 for detecting the electromagnetic field 4 and determining the proximity of the structure 1 can for example comprise two sensors for the detection of electromagnetic fields, spaced apart in a known distance, whereby the proximity of the source of the electromagnetic field, in particular the electromagnetic field 4 emitted by the current 5 flowing along the structure 1 can be detected and a distance to the signal source can be determined according to the differences of the detected field 4 at the two sensors. The detection unit 3 can for example be built as known from WO2008/064851 or WO2008/064852.

Figure 4:
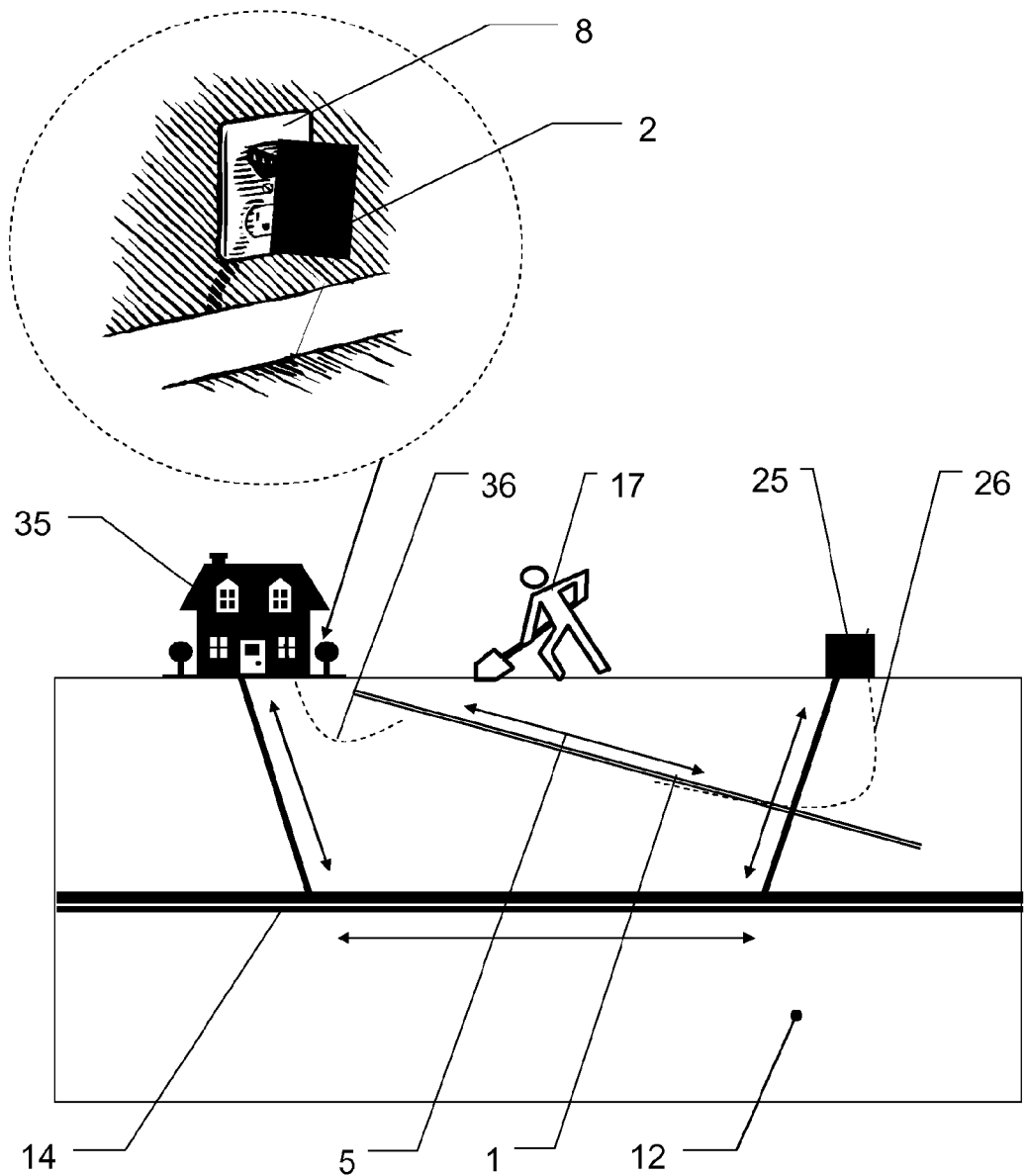
FIG. 4 shows a first working example of the setup for the proximity detection method and the flow of the current according to the invention to avoid a collision with an underground gas service while digging.

In FIG. 4, the invention helps a worker 17 digging for a defect underground conduit 1, the location of which can only be roughly assumed. For example a plastic water conduit running from a house to a garden fountain, which was buried ages ago without any proper documentation. Since the water conduit is attached to earth bounded, domestic copper pipes on one side and an iron fountain structure on the other side, the water inside the conduit can act as a conduction path. Therefore, a soil current 5 supplied in vicinity can make its location and depth detectable by a standard CAT-tool. According to the invention, a socket plug device 2 is plugged into the socket 8 at the local property 35. There a first, local grounding point 36 is provided via the Earth conductor of the plug. The Neutral conductor of the plug is running via the mains power line 14 to a remote power distribution station 25, where it is remotely grounded 26 as a second remote grounding. Thereby, a soil 12 flow path of the detection signal 5 is established, which allows the detection of the sought conduit 1 as explained above.

Figure 5:
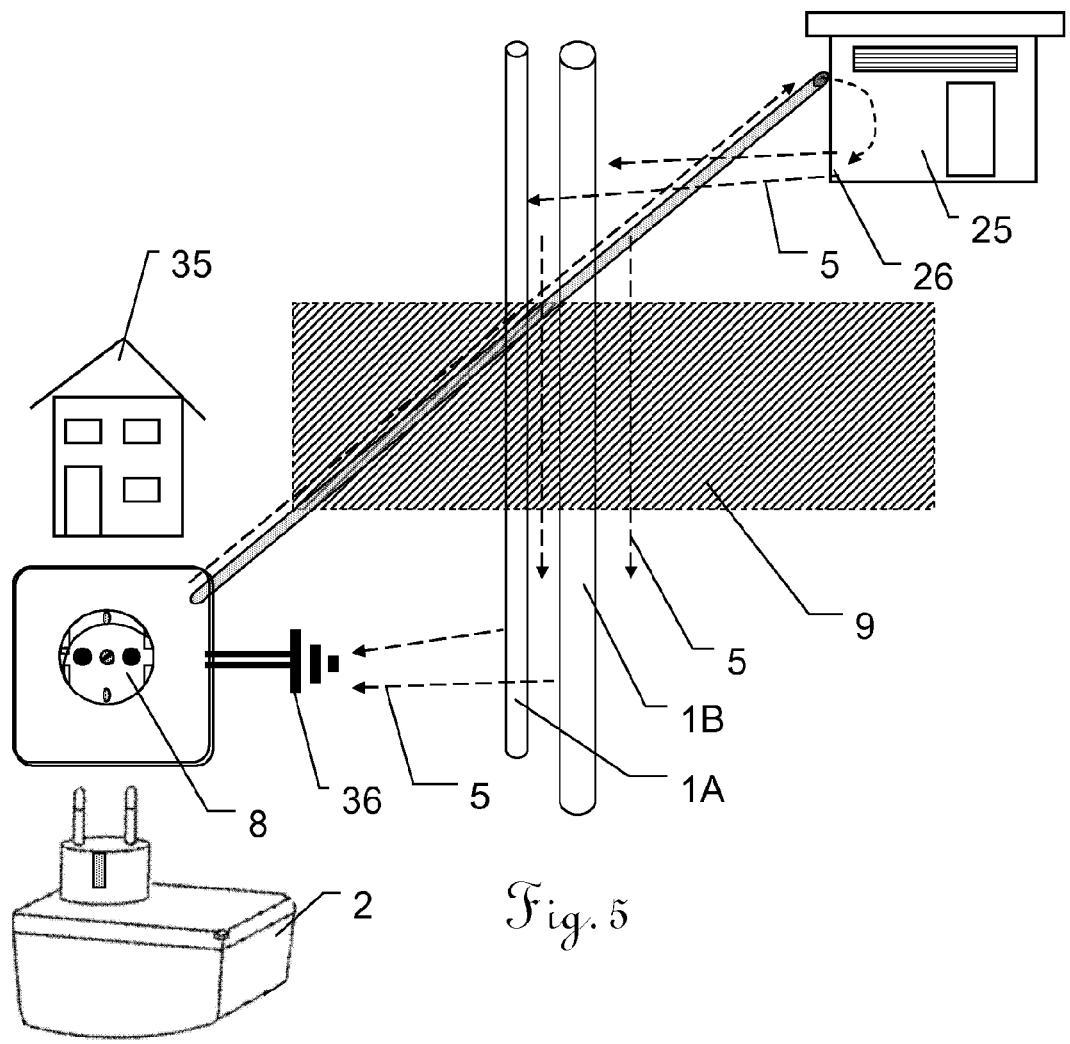
FIG. 5 shows a second working example of the proximity detection method according to the invention to avoid a collision with a plastic water conduit while digging in an excavation area.

FIG. 5 shows a schematic view of another embodiment according to the invention. In this figure, applying a suitable signal between the Earth and the Neutral+Live wires in a domestic property 35 is established by plugging a device 2 into a socket 8. This establishes a circuit such that the Earth Returned Injected Current signal 5 travels from a local grounding 36 of the earth wire through the ground 12 between the local property 35 and the substation 25, or another place 26 where the Neutral wire is connected to soil. Using the mains wiring 14 the Earth Returned Injected Current 5 can be made to flow through the ground 12, between the two earth points 26 and 36, preferably following the buried service structures 1A,1B to be detected in the area 9.

Figure 6:
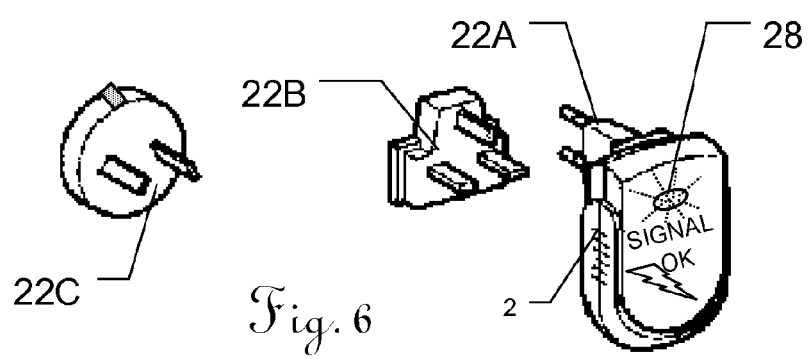
FIG. 6 shows an exemplary embodiment of a device for supplying detection signals via a mains socket according to the invention.

FIG. 6 shows an exemplary embodiment of a detection signal supply 2 according to the invention. As the device 2 will be plugged into a live socket, the device can also be power by the mains supply.

The shown device has an indicator 28 to show proper operation. Proper operation can comprise information whether the socket plugged into is live or not and/or if the detection signal can be supplied properly. A proper supply can for example be evaluated according to criteria like current strength of the detection signal. Is the current strength to low, an insufficient or no connection to soil is established. If the current is above an upper limit, this can also mean that most likely no earth currents are introduced, e.g. in case of a nearby short circuit of the detection signal, e.g. a direct conductive connection of Neutral and Earth at the property 35. In another embodiment, a current strength of the detection signal can also be regulated to a desired level by the device, to ensure proper function. As the device is plugged into mains, the voltage of the detection signal can even be higher than the safety level for low voltages, as the conductors involved are per definition designed for such voltage levels. In case of an indication of a failure, it can be tried to changeover to another socket, e.g. at another nearby property or the classical means for supplying earth currents by earth spikes can be used.

The socket-plug 22A can be embodied as an interchangeable module 22A,22B,22C, which allows an easy customisation for the different socket types used all over the world. In another embodiment, the socket-plug end 22A can also be of fixed type for each region and adapters (so-called travelling-adapters) can be used if confronted with another socket type. Although only the more common single-phase plugs are shown, the invention can also use three phase plugs.

Figure 7:
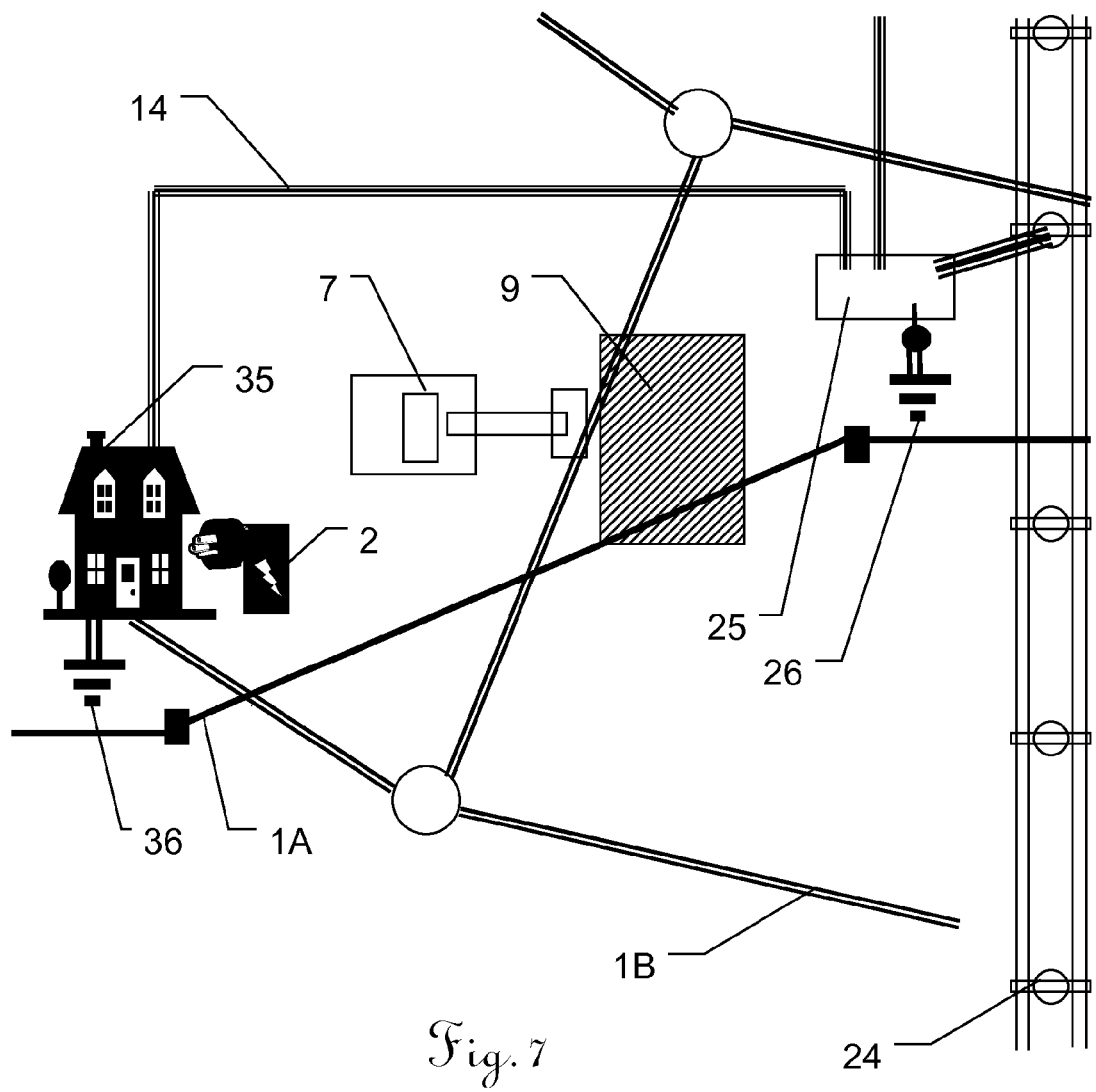
FIG. 7 shows a third working example of the setup for the proximity detection method according to the invention to avoid a collision with various underground services in an excavation area.

FIG. 7 shows an example of a detection site in an overhead view. There is a detection area 9 at a worksite to be trenched by earth moving machinery 7. Before or while doing so, it has to be ensured that the area 9 is clear of underground services, like fresh- or waste-water pipes, communication cables, gas pipes, long distance heating, etc. It can for example be a task to detect the mere presence of those services, to exactly locate them, to determine the depth they are buried or to verify that no service is overlooked. In the drawn example, there are a cable TV service 1A and a waste water service 1B crossing the area of interest. The detection can be done with detection equipment for electromagnetic fields, which for example is also capable to determine or estimate the distance of the source of the field to the device.

Nevertheless, shielded cable TV-lines 1A emit only a small amount of electromagnetic fields to the outside of the cable and this small amount of field is in a high frequency range which does not propagate well in soil. Even worse, a water conduit 1B has no naturally occurring electromagnetic field which can be detected. Those issues can be solved by introducing earth currents, flotation through soil and therein preferably along such buried structures as they provide a path of least resistance within soil.

According to the invention, the detection signal is supplied to soil by simply plugging in a detection signal source 2 to a socket 8 at a nearby property 35. This obviously introduces a detection signal to the mains power line 14, but this is not the primary intent of the invention. (Nevertheless, it is an advantage to ensure a good detection signal on the power lines as they are highly hazardous if they get damaged by earthwork.) According to the invention, one electrical pole of the detection signal source 2 is connected to the protective earth wire (PE) of the socket, which is locally grounded 36 at the property 35, and thereby supplied to soil by a first soil connection 36. The other pole of the detection signal source 2 is connected to the neutral wire (N) of the socket. Connected in this sense means to provide a low impedance for the detection signal, not necessarily a direct conductive connection. The neutral wire (N) is remotely grounded 26 at the electrical supply substation 25, which is somewhere remote of the property 35. The remote sub station 25 provides a second soil connection 26, which is remote to the first one. It can be an electrical terminal box for the connection of multiple households, a transformer station, a power plant, etc. In the drawn embodiment, power lines 14 from multiple properties are collected at the substation 25 and connected to a primary power supply line 24 running to main stations which can then be linked to a regional high voltage power grid.

For the electrical circuit of the detection signal 5 to be closed, the detection signal takes a path from the local grounding 36 to the remote grounding 26 through soil, preferably the path of least resistance which is along the buried services 1A and 1B. So, according to the invention, those services are made detectable by a simple socket connection, without any additional wiring at or near the worksite 9.

Figure 8:
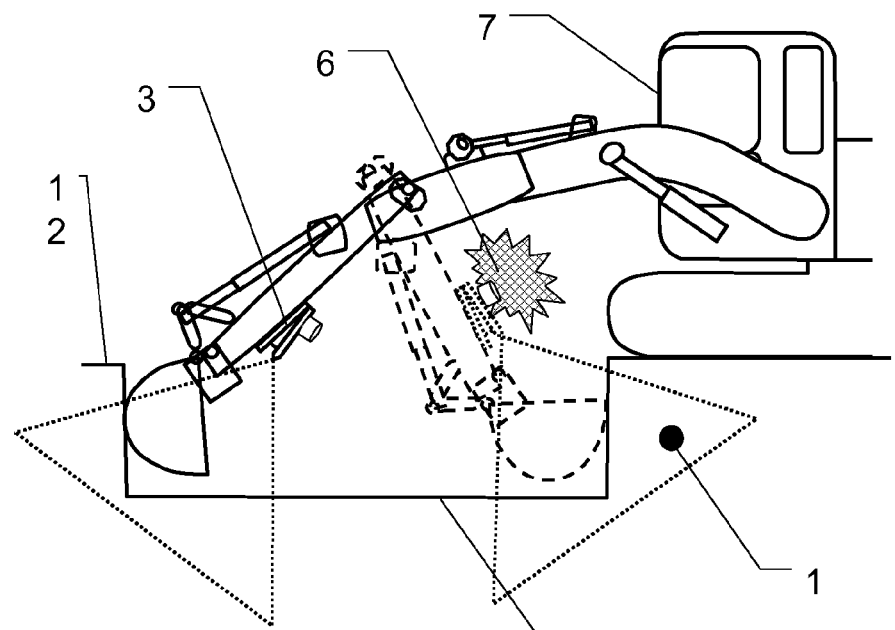
FIG. 8 shows a working example of the proximity detection method with the detection unit mounted on an excavator and an example of the setup on site according to the invention.

FIG. 8 shows a close-up view of an excavator 7 equipped with a detection unit 3 for detecting buried services. The structure 1 buried in the soil 12 guides the soil current 5 introduced at a nearby socket, as described in detail above. If, as drawn in broken lines, the structure 1 gets in to the range of the detection unit 3 marked by dotted lines, a warning signal 6 alerts the operator of the proximity of the structure 1. The operator can carry on his work with extreme caution or start to work the section around the structure 1 by hand in order to avoid damage to the structure 1. According to the present invention, the operator of such an excavator 7 just needs to plug a device 2 like explained above into a nearby mains socket 8 and the detection system according to the invention is operational.

Figure 9:
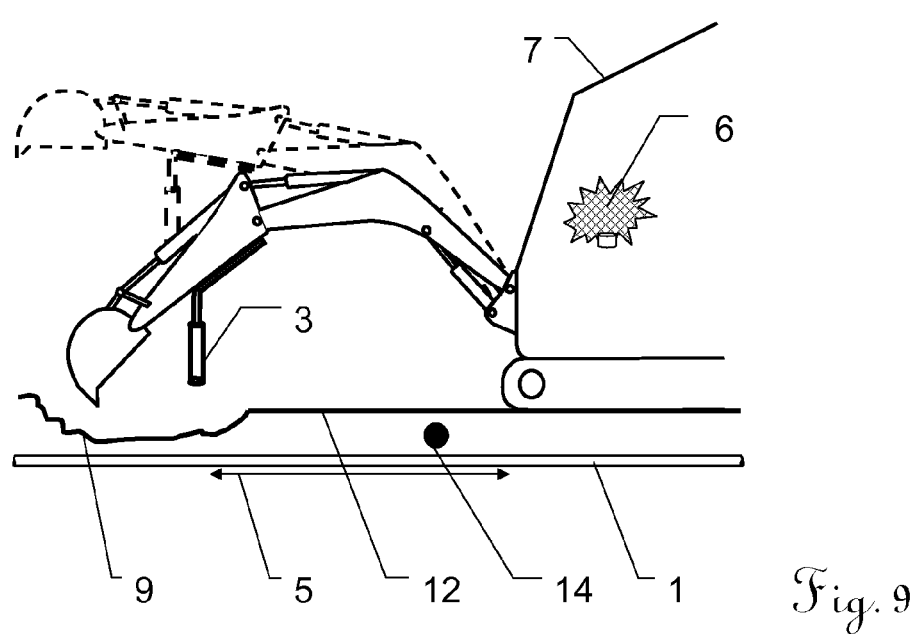
FIG. 9 shows a working example of the proximity detection method with the detection unit mounted on an excavator and an example of the setup on site according to the invention.

FIG. 9 shows another example for practical usage of the detection method according to the invention. The excavator 7 is equipped with a detection unit 3. If the electromagnetic field of the detection signal 5 at an underground structure 1,14 is detected underneath the detection unit 3 in the excavation-area 9 while digging, an optical, acoustic, or haptic warning 6 or an electrical signal that disables the excavator 7 or parts of it, is issued. The detection signal supply 2 is plugged into a nearby socket 8 and a current 5 generated by it is introduced into the soil 12 and closing it's electrical circuit via a mains power service 14. The most hazardous of the buried services, the mains power 14, will be assured to have a detection signal on it, as it is directly conducted to the detection signal. But according to the invention, the detection signal 5 also flows through soil, mainly along the paths of least resistance in-between the at least two grounding points—which path is along the other buried services 1 which are to be detected according to the invention. Any other conductive buried services 1 in the excavation area 9, which is connected to Earth, will provide a lower impedance path for the detection signal current than the surrounding soil or ground and will therefore carry the detection signal. According to the invention, the soil detection signal 5 is supplied without a dedicated cable being laid out for this purpose.

Figure 10:
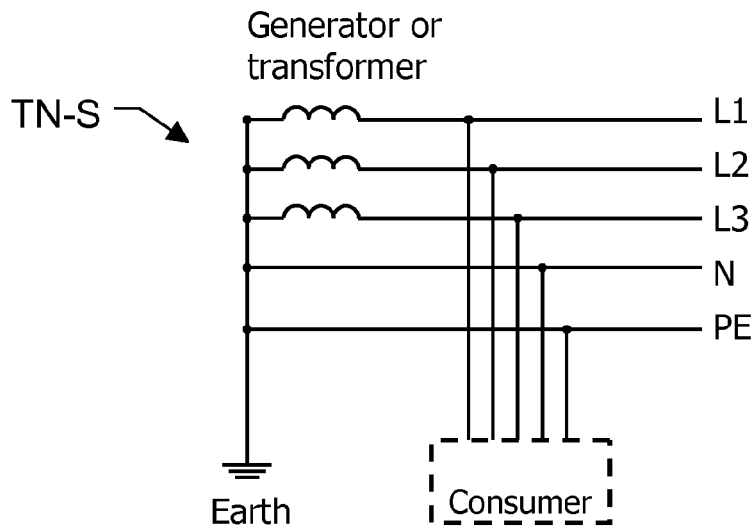
FIG. 10 shows different earthing systems and how the present invention embodies in those.
Figure 10:
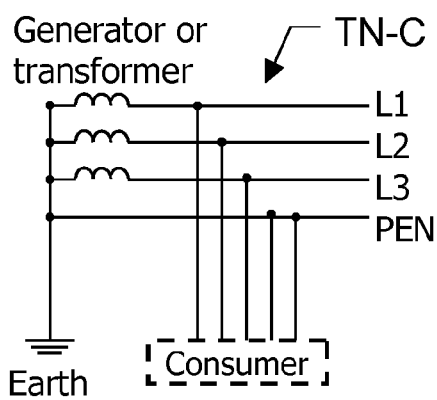
Figure 10:
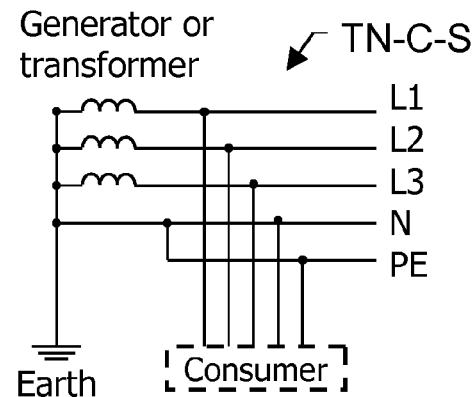
Figure 10:
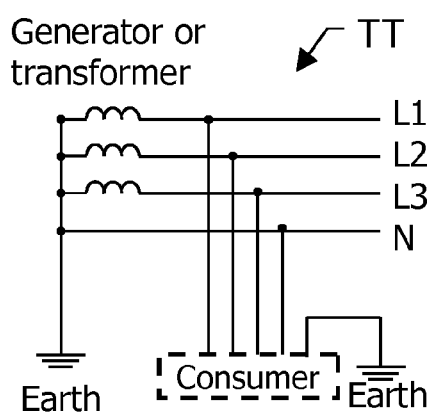
Figure 10:
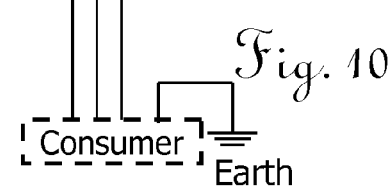

The distribution of the socket supplied detection signal 5 depends on the earthing arrangement. In majority TN-S and TT arrangements are used which will usually also achieve best detection results as there is most resistance between the two Earth points. Nevertheless, various arrangements exist, which are shown in FIG. 10.

The International Standard IEC 60364 distinguishes three families of earthing arrangements, using the two-letter codes TN, TT, and IT. The first letter indicates the connection between Earth and the power-supply equipment, for example a generator or a transformer, which is defined as:
T—Direct connection of a point with earth (Latin: terra);
I—No point is connected with earth (isolation), except perhaps via a high impedance.

The second letter indicates the connection between earth and the electrical device being supplied, which is defined as:
T—Direct connection of a point with Earth;
N—Direct connection to neutral at the origin of installation, which is connected to the Earth.

In a TN Earthing system, one of the points in the generator or transformer is connected with earth—usually the star point in a three-phase system. The body of the electrical device is connected with earth via this earth connection at the transformer. The conductor that connects the exposed metallic parts of the consumer is called protective earth (PE). The conductor that connects to the star point in a three-phase system, or that carries the return current in a single-phase system, is called Neutral (N). Three variants of TN systems are distinguished:

- TN-S: PE and N are separate conductors that are connected together only near the power source. There are separate protective earth (PE) and neutral (N) conductors from transformer to the consuming device, which are not connected together at any point after the building distribution point. This arrangement is the current standard for most residential and industrial electric systems in North America and Europe.
- TN-C: A combined PEN conductor fulfills the functions of both a PE and an N conductor. The combined PE and N conductor runs all the way from the transformer to the consuming device. Rarely used.
- TN-C-S: Part of the system uses a combined PEN conductor, which is at some point split up into separate PE and N lines. The combined PEN conductor typically occurs between the substation and the entry point into the building, and separated in the service head. In the UK, this system is also known as protective multiple earthing (PME), because of the practice of connecting the combined neutral-and-earth conductor to real earth at many locations, to reduce the risk of broken neutrals. A similar system in Australia is designated as multiple earthed neutral (MEN). Therein it is possible to have both TN-S and TN-C-S supplies from the same transformer. For example, the sheaths on some underground cables corrode and stop providing good earth connections, and so homes where "bad earths" are found get converted to TN-C-S. The combined PEN conductor runs from transformer to building distribution point, but separate PE and N conductors are present in fixed indoor wiring and flexible power cords.

In a TT Earthing system, the protective earth connection of the consumer is provided by a local connection to earth, independent of any earth connection at the generator. An big advantage of the TT Earthing system is the fact that it is clear of high and low frequency noises that come through the neutral wire from various electrical equipment connected to it. This is why TT has always been preferable for special applications like telecommunication sites that benefit from the interference-free Earthing. Also, TT does not have the risk of a broken neutral.

In locations where power is distributed overhead and TT is used, installation earth conductors are not at risk should any overhead distribution conductor be fractured by, say, a fallen tree or branch.

In pre-RCD (residual current devices) era, the TT Earthing system was unattractive for general use because of its worse capability of accepting high currents in case of a live-to-PE short circuit (in comparison with TN systems). But as RCDs mitigate this disadvantage, the TT Earthing system becomes attractive for premises where all AC power circuits are RCD-protected.

The TT Earthing system is used throughout Japan, with RCD units in most industrial settings. This can impose added requirements on variable frequency devices and switched mode power supplies which often have substantial filters passing high frequency noise to the ground conductor.

In an IT network, the distribution system has no connection to earth at all, or it has only a high impedance connection. In such systems, an insulating monitoring device is used to monitor the impedance.

While the national wiring regulations for buildings of many countries follow the IEC 60364 terminology, in North America (United States and Canada), the term "equipment grounding conductor" refers to equipment grounds and ground wires on branch circuits, and "grounding electrode conductor" is used for conductors bonding an earth ground rod (or similar) to a service panel. "Grounded conductor" is the system "neutral". Australian standards use the mentioned modified PME Earthing system called Multiple Earthed Neutral (MEN), where the Neutral is Earthed at each consumer service point and thereby effectively bringing the Neutral potential difference to zero along the whole length of LV lines.

Figure 11:
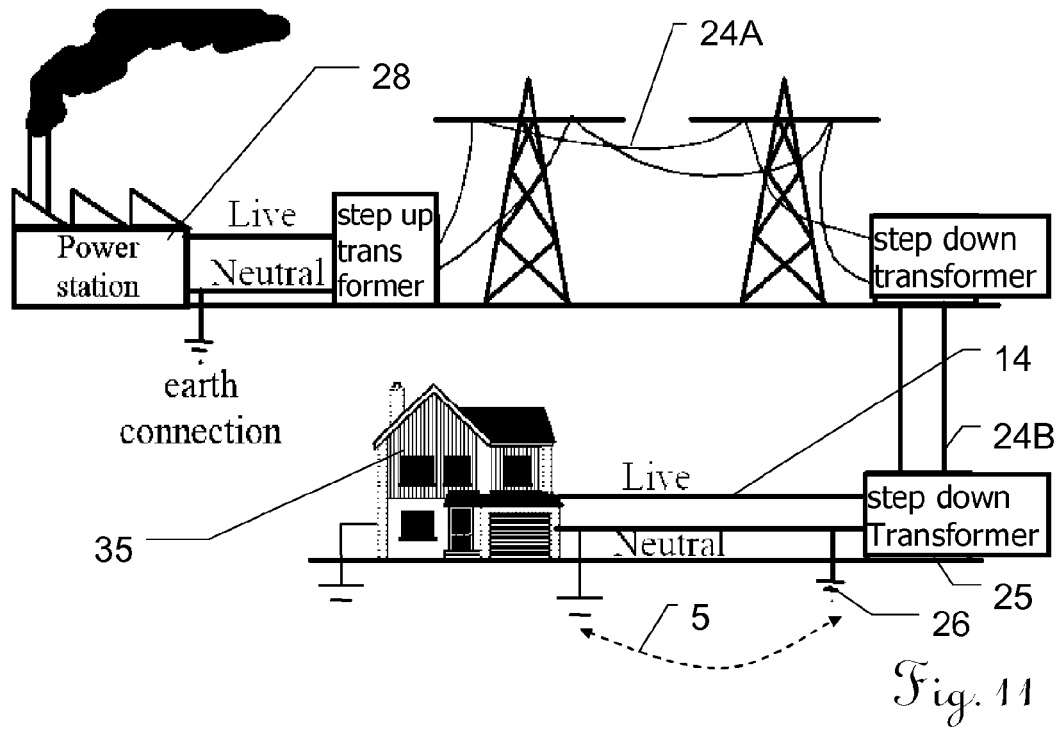
FIG. 11 shows an example of a second embodiment of a detection signal supplying according to the invention.

For example FIG. 11 shows an arrangement similar to FIG. 1—but with a different earthing system, in particular a TN-C-S system whereas FIG. 1 shows a TT-S system.

In this embodiment, the socket supplied detection signal 5 is applied to both Live and Neutral conductors of the socket 8. Therefore, the most hazardous service, the mains power itself, can always be detected. In this situation, however, the signal in the soil can be restricted by multiple earths along the Neutral conductor. A signal will still be present, as the Live conductor transmits some of the signal to the remote earthing 26 via the local transformer 25 but the returned signal in the soil 12 can be limited by the resistance of the Neutral conductor, wherefore the portion of the detection signal 5 being coupled via soil 12 to the other buried conductive services 1 can be reduced.

By monitoring the current flowing between the Neutral and Earth, or Live and Earth, by the device 2 as explained above, a poor performance of the configuration which can occur in a setup as shown in FIG. 11, can be indicated at the device, for example by an LED.

Figure 12:
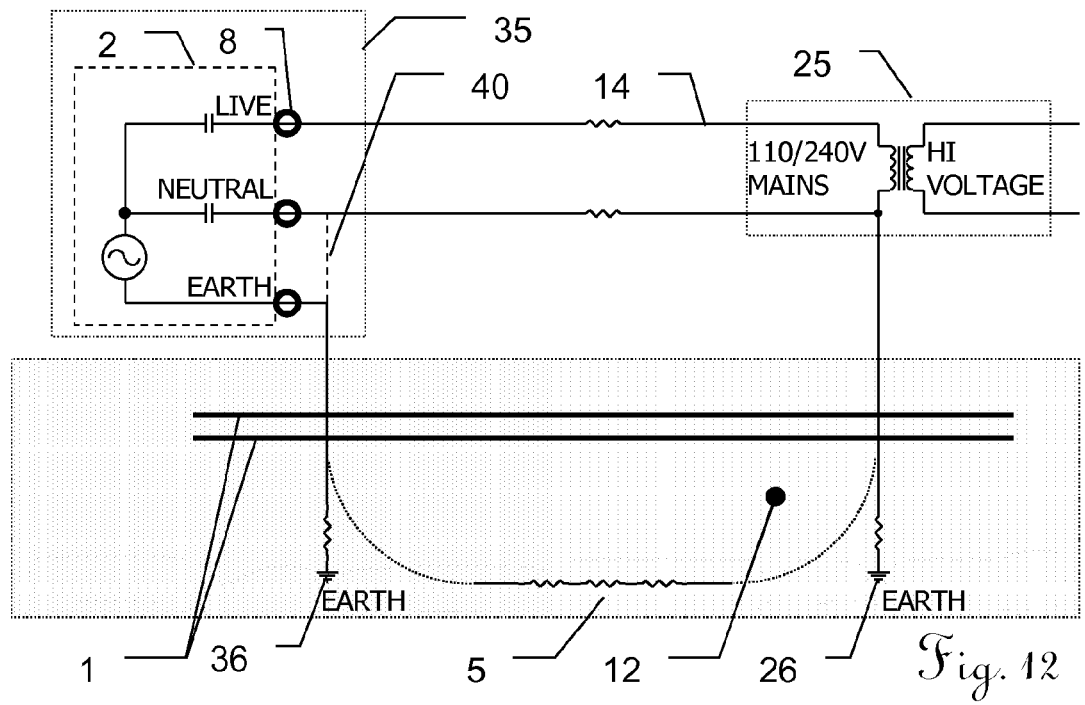
FIG. 12 schematically shows an embodiment of an equivalent circuit of supplying detection signal to soil via a mains socket according to the invention.

The detection signal can be supplied via live or neutral or both of those services with respect to PE. In the embodiment of FIG. 12 Live and Neutral are coupled to the signal source.

The device 2 can indicate to which conductor which signal strength of the detection signal is supplied. This information allows for example not only to ensure a proper detection signal supply but can also be used for indicating what kind of earthing system is likely used at the actual detection site or if there are severe malfunctions like short-circuits or interruptions on the power supply conductors at the socket being used. Also, a logically combined indication of the signal strengths can be established for providing more detailed or more sophisticated information to the user.

Alternatively, in a further embodiment multiple phase detection signal 5 can be supplied in-between the three different conductors of the socket 8, for example two different phase or frequency shifted detection signals 5 can be supplied to neutral resp. live and PE. Thereby a detection signal can be supplied between all permutations of the conductors at the socket.

The dashed line 40 in FIG. 12 can be a building distribution point of a TN-C-S system. Where an installation includes a connection 40 (as for example in a PME protective multiple earth arrangement), the signal in the soil 12 can be restricted. A portion of the signal will still be supplied to soil 12 as the Live conductor also transmits some of the signal to the remote earthing point 26 but, in this case, this portion of the signal can be limited by the resistance of the Neutral conductor. Such limited performance can again be indicated by the device 2, e.g. by monitoring the impedance to which the detection signal is supplied. In case the earthing configuration at the property 35 is indicated to provide poor performance, the device 2 can be relocated to another property nearby, or the classical earth-spike approach can be used, but if the supplying via the socket 8 works, the setup for a service detection by earth injected currents is simplify compared to prior art.

Applying the detection signal 5 can, in particular in TT or TN-S earthing systems, be done in between a Neutral-conductor and an Earth-conductor of the socket 8—wherein the electrical circuit of the detection signal 5 is closed by a to be detected soil conducted current from a domestic, local earthing 36 of the Earth-conductor to a remote earthing 26 of the Neutral-conductor at a substation 25 of a mains supply network 14.

Applying the detection signal 5 can also, in particular in TN- (preferably in a TN-S) earthing systems, be done in between a Live- and an Earth-conductor of the socket 8—wherein the electrical circuit of the detection signal 5 is closed by a to be detected soil conducted current from a domestic, local earthing 36 of the Earth-conductor to a remote earthing 26 of a neutral point of a transformer for the live-conductor at a substation 25 of a mains supply network 14.

Applying the detection signal 5 can also be done inbetween Live-Neutral- and Earth-connector at the socket. In a special embodiment, Live- and Neutral-connector can be supplied by the same detection signal.

Figure 13:
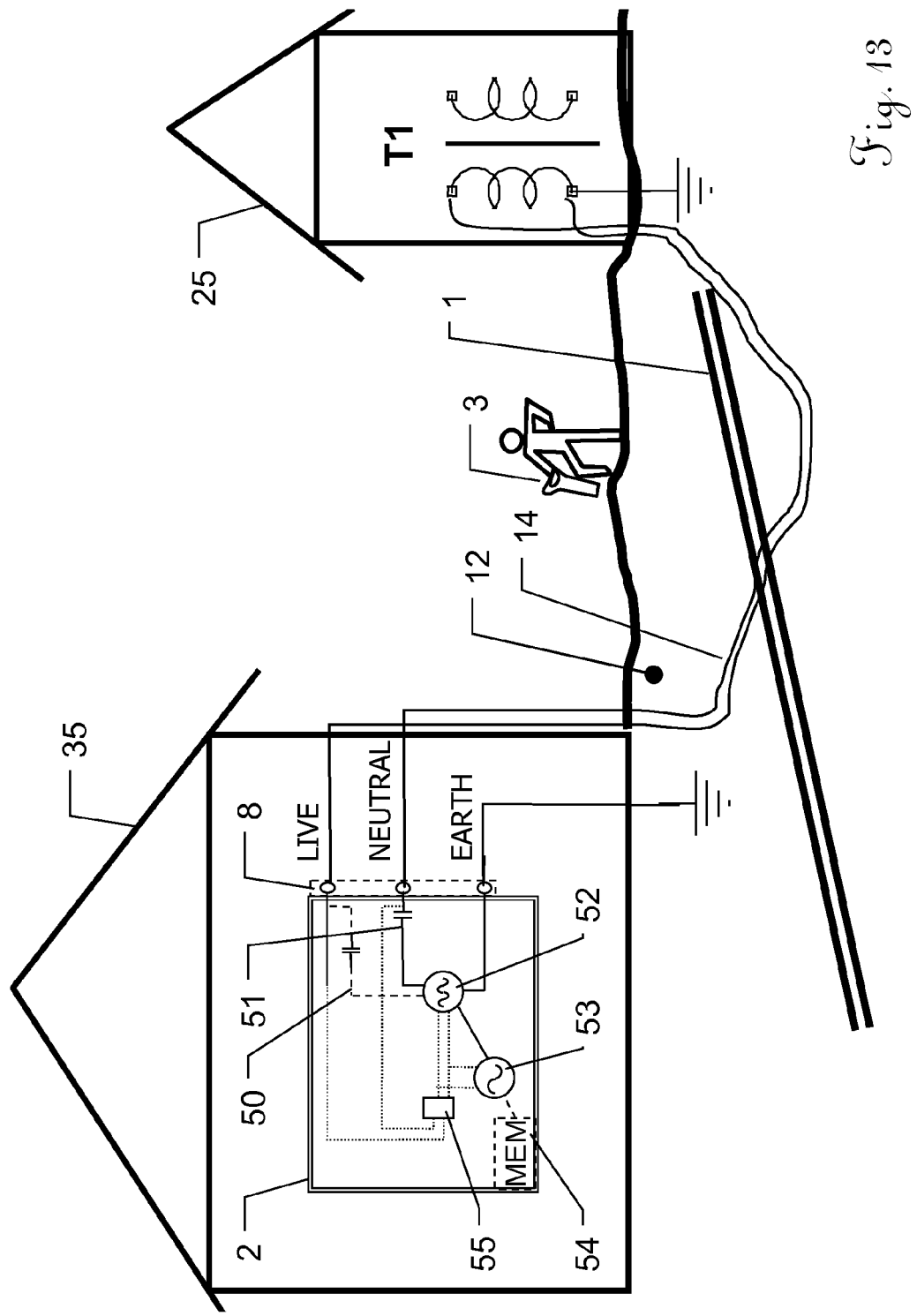
FIG. 13 schematically shows an embodiment according to the invention, with a detection signal supply providing a modulated detection signal via a mains socket to soil.

FIG. 13 shows an example of a schematic block diagram of an embodiment of a detection signal supply 2 providing a modulated detection signal as described further above. Introducing the detection signal 5 can for example be done with a detection signal 5 of a base frequency in the range of 5-300 kHz, especially with e.g. about 33 kHz. The detection signal 5 in this embodiment is an alternating signal of a first (base) frequency which is modulated. The modulation and demodulation can be embodied by various known techniques like AM (amplitude modulation), FM (frequency modulation) or PM (phase modulation) respectively their digital pendants like ASK (Amplitude-shift keying), FSK (Frequency-shift keying), PSK (Phase-shift keying) or other modulation techniques. There are also pre-built chips, circuitries or microcontrollers available for implementing such modulations and/or demodulations. On the Receiver side it is also possible to use a SDR (Software-defined radio) based detection approach to increase the flexibility of the detection signal evaluation, demodulation, etc.

The modulation can for example be done by a modulating signal of a defined second (modulation-) frequency and/or according to a modulation sequence predefined in the detection signal supply. The modulation sequence is defined and generated from within the in the detection signal supply 2 and can in particular be periodic, and the detection signal 5 is modulated by a predefined repeating pattern which is stored in the device, according to which the detection signal can be identified and distinguished from other signals. There is no external provision of the modulation frequency or sequence for modulation by external sources. Unlike e.g. power line modems as presented in GB 2 174 273, the detection signal supply device 2 according to the invention can be built as an unidirectional device with a detection signal generator 52 for generation of the detection signal 5 and supplying it to mains but without a receiving section for detection and evaluation of signals which are present on the mains-system to which it is connected.

For achieving such, the above described modulation means 53 and the detection signal generator 52, can be built for a modulation of the detection signal 5 being generated, in particular with the modulation of the detection signal 5 according to a predefined sequence stored within the signal supply device 2 and/or with a fixed predefined second frequency. In particular it can be built without a receiving section for signals present on the mains lines it is connected to. The signal supply device 2 with its detection signal generator 52 is built to provide a detection signal 5 flowing at least partially though soil and originating an electromagnetic field 4 to be detected or located by a mobile detection unit 3. The signal supply device 2 can be an unidirectional signal injector which is not for bidirectional power-line communication with another device. The signal supply device 2 can comprise a transmitter only, can be receiverless and/or does not comprise an input means for externally provided data for a modulation of the detection signal.

The detection of the service 1 (which is not required to be directly connected to the mains supply) buried in ground 12 can be done by the usage of a standard detection unit 3 which is sensitive (in particular tuned or filtered) for the base frequency of the modulated detection signal 5. Nevertheless, in this embodiment with a modulated detection signal 5 it is preferred to use a detection unit 3 evaluates the modulation (and its sequence if such is present). By the evaluation of the modulation at the detection device 3, the above mentioned advantages like identification of the detection signal 5 and improvements in the detection sensibility with a lowering of the required SNR (e.g. as the modulated detection signal can be better identified out of the noise according to its modulation can be gained.

The shown setup with the local property 35 grounding and remote mains supply 25 groundings and the resulting detection signal 5 flow-path are similar as in the embodiments elaborated above. The shown embodiment of the detection signal supply 52 connected to the socket 8 has a power supply unit 55, for utilizing power from mains to supply the device 2. The power supply unit 55 can—here and in the embodiments above—also comprise an electrical power storage, like an accumulator, so the device 2 can also be powered if the mains socket 8 is not live. It comprises a detection signal generator 52 which supplies the detection signal 5 to the mains socket 8. As discussed before, the supplying can be done either onto neutral—via the coupling 51, or onto live—via the coupling 51, or onto both. The detection signal supply 52 is built in such a way that the supplied detection signal 5 can be modulated by the modulation source 53 inside of the device 2. The modulating signal from the modulation source 53 to the detection signal supply 52 can be embodied as a modulating signal of a defined frequency and/or with a defined modulation sequence, which can for example be stored in a memory 54 in the device 2. The actual modulation that is used is preferably also known by the detection device 3, so it can associate a received detection signal 5 with the detection signal supply 2 according to its specific modulation and to differentiate the detection signal 5 from other disturbances.

When using the modulated detection signal 5 described above, the detection unit 3 can be built in such a way to detect the modulation of the detection signal 5, in particular to identify the detection signal 5 according to its modulation, e.g. by a demodulation and evaluation of the modulation frequency or sequence of the received detection signal in the detection unit 3.

What is claimed is:

1. A method for detecting buried services by electromagnetic means with
   introducing an artificially generated electrical detection signal as an alternating electrical current of a desired frequency from a current-source, indirectly via soil to the buried service,
   detecting an electromagnetic field originating from the introduced underground detection signal, which is floating along the buried services, by a mobile detection unit above ground, wherein the unit is electrically insulated from the ground, and
   determining the proximity of the buried services to the detection unit according to the detected electromagnetic field of the detection signal,
   wherein,
   the soil conducted detection signal is supplied via a mains socket, in such a way that a flow path of the detection signal is:
   from the current-source to a first conductor of mains wiring at the socket,
   via the first conductor from the socket to a remotely located substation of a mains supply network, where the first conductor is remotely grounded, so that the detection signal is conducted to soil material,
   floating through the soil material and following at least a part of the buried service as path of least resistance within the soil material,
   from the buried service through soil material to a domestic earthing point, where a second conductor of mains wiring is grounded, and
   via the second conductor to the mains socket and back to the current-source.

2. The method according to claim 1, wherein the method comprises applying the detection signal inbetween a neutral and an earth-conductor of the socket, wherein the electrical circuit of the detection signal is closed by a to be detected soil conducted current from a domestic, local earthing of the earth-conductor to a remote earthing of the neutral conductor at a substation of a mains supply network.

3. The method according to claim 1, wherein the method comprises applying the detection signal inbetween a live- and an earth-conductor of the socket, wherein the electrical circuit of the detection signal is closed by a to be detected soil conducted current from a domestic, local earthing of the earth-conductor to a remote earthing of a neutral point of a transformer for the live-conductor at a substation of a mains supply network.

4. The method according to claim 1, wherein
the detecting comprises the buried service, being a non-mains-supply-service which is separate of the mains supply network and unconducted to an electrical circuit of the mains socket, according to the soil conducted detection signal floating along at least part of the buried service.

5. The method according to claim 1, wherein the method comprises an indicating of an electrical current level of the detection signal being within a desired range or a gauge indicating the electrical current level.

6. The method according to claim 2, wherein the method comprises an indicating of whether the detection signal is supplied via the socket's Live or via Neutral or via both of those wires.

7. The method according to claim 1, wherein the method comprises an introducing of the detection signal with a voltage value above a low voltage safety level, wherein the detection signal has a voltage above 50 volts.

8. The method according to claim 1, wherein
modulating the introduced detection signal with a defined modulation signal according to a predefined sequence.

9. The method according to claim 1, wherein the second conductor of mains wiring is a protective earth conductor.

10. The method according to claim 1, the method comprises detecting a plurality of buried services with the detection signal, wherein at least one buried service is electrically passive and has no naturally occurring electrical signal.

11. The method according to claim 1, wherein the detection signal has a frequency in the range of 5-300 kHz.

12. The method according to claim 1, wherein the detection signal has a frequency of about 33 kHz.

13. The method according to claim 1, wherein the detection signal is an alternating signal of a first frequency which is modulated by a modulation signal of a defined second frequency or according to a modulation sequence predefined in a means which is generating the detection signal.

14. A method for detecting buried services by electromagnetic means with
introducing an artificially generated electrical detection signal as an alternating electrical current of a desired frequency from a current-source, indirectly via soil to the buried service,
detecting an electromagnetic field originating from the introduced underground detection signal, which is floating along the buried services, by a mobile detection unit above ground, wherein the unit is electrically insulated from the ground, and
determining the proximity of the buried services to the detection unit according to the detected electromagnetic field of the detection signal,
wherein,
the soil conducted detection signal is supplied via a mains socket, in such a way that a flow path of the detection signal is:
from the current-source to a second conductor of mains wiring at the mains socket of a property, where the second conductor is grounded at a domestic earthing point, so that the detection signal is conducted to soil,
floating through the soil and following at least a part of the buried service as path of least resistance within the soil,
from the buried service through the soil to a first remotely grounded conductor of mains wiring at a substation of a mains supply network, where the first remotely grounded conductor is grounded, and
via the first remotely grounded conductor from the substation of a mains supply network to the mains socket at the property and back to the current-source.

* * * * *